April 28, 1925.
E. M. BARROS
COMBINATION TAIL LIGHT, SIGNAL, AND LICENSE PLATE HOLDER
Filed June 12, 1923  2 Sheets-Sheet 1
1,535,089
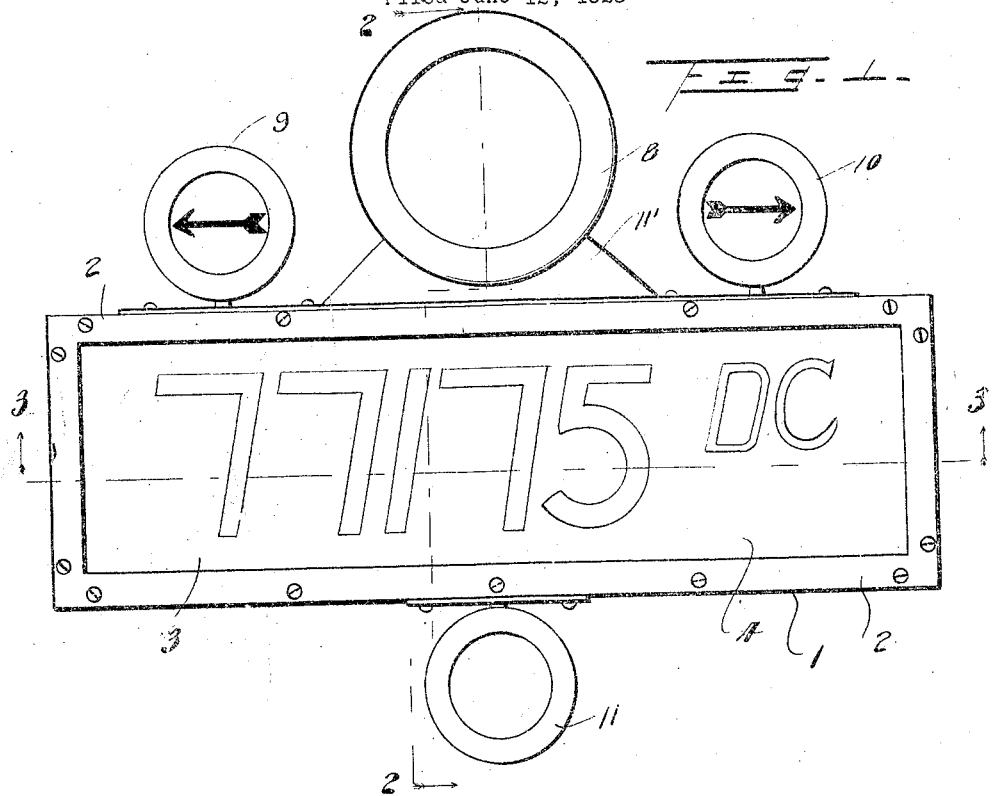
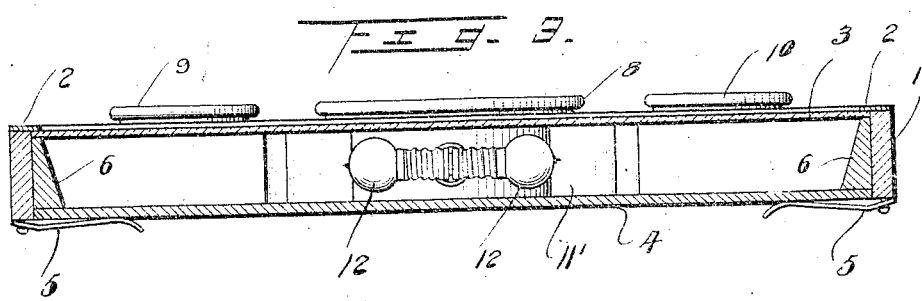
Inventor
E. M. Barros.

April 28, 1925.
E. M. BARROS
1,535,089
COMBINATION TAIL LIGHT, SIGNAL, AND LICENSE PLATE HOLDER
Filed June 12, 1923    2 Sheets-Sheet 2
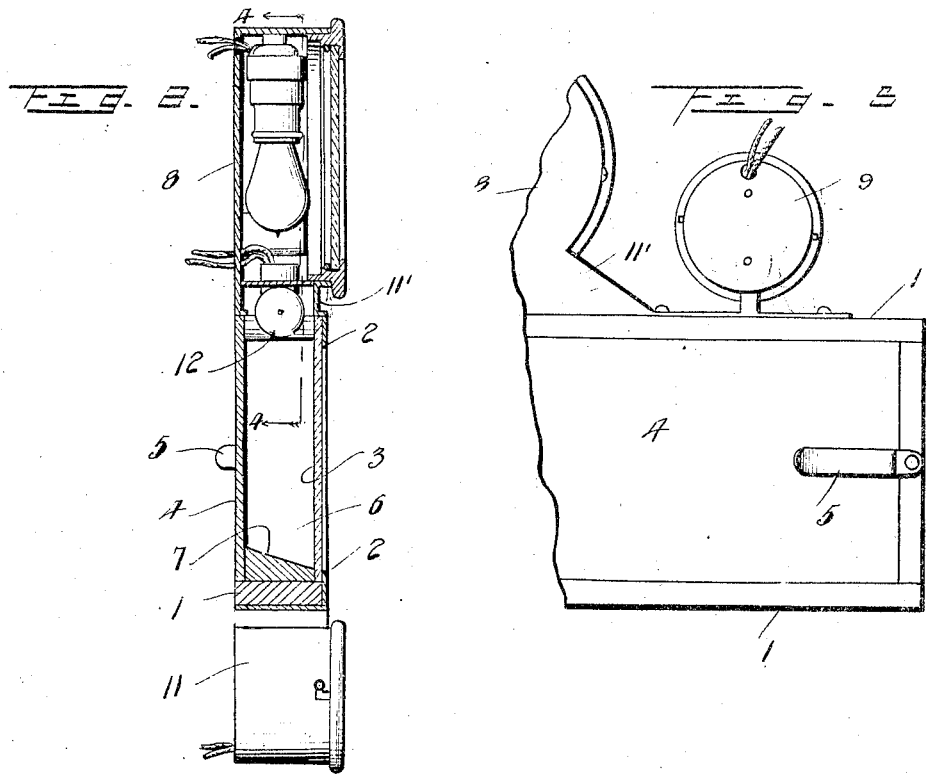
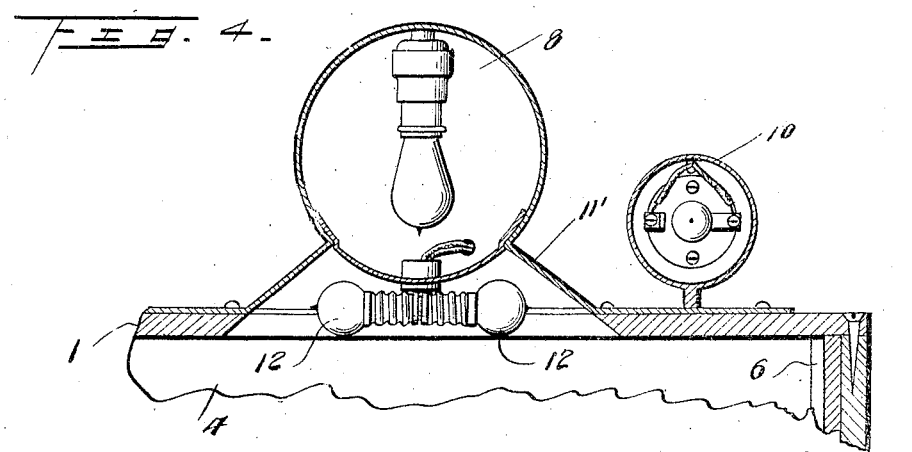
Inventor
E. M. Barros.

Patented Apr. 28, 1925.

1,535,089

UNITED STATES PATENT OFFICE.

EMANUEL M. BARROS, OF STAMFORD, NEW YORK.

COMBINATION TAIL LIGHT, SIGNAL, AND LICENSE-PLATE HOLDER.

Application filed June 12, 1923. Serial No. 644,931.

*To all whom it may concern:*

Be it known that I, EMANUEL M. BARROS, a citizen of the United States, residing at Stamford, in the county of Delaware and State of New York, have invented certain new and useful Improvements in Combination Tail Lights, Signals, and License-Plate Holders; and I do hereby declare the following to be a full, clear, and exact description of the invention, such as will enable others skilled in the art to which it appertains to make and use the same.

The object of this invention is the provision of an accessory for motor vehicles which subserves the threefold office of a tail light, signal and license plate holder, the arrangement being compact and embodying a few number of parts and which insures an illumination of the license plate so that the same may be easily read at the required distance from the vehicle.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a front view of a combined tail light, signal and license plate holder embodying the invention, Figure 2 is a transverse sectional view thereof on the line 2—2 of Figure 1, Figure 3 is a horizontal sectional view on the line 3—3 of Figure 1, looking upwardly as designated by the arrows, Figure 4 is a detail sectional view on the line 4—4 of Figure 2, looking towards the rear as indicated by the arrows, and Figure 5 is a view in rear elevation of a fragmentary portion of the device particularly illustrating one of the fastenings and the manner in which it cooperates with the license plate to secure the latter in position.

Corresponding and like parts are referred to in the following description and designated in the several views of the drawings by like reference characters.

The article comprising an elongated frame 1 having a frame 2 at the front to sustain a glass plate 3 and adapted to be closed at its rear by means of a license plate 4 which may be retained in place by suitable fastening means 5. End strips 6 and a bottom longitudinal strip 7 are disposed between the front plate 3 and the rear plate 5 and prevent inward displacement thereof. Directional signals 8, 9 and 10 are mounted upon the top member of the frame and a tail light 11 is disposed upon the lower member of the frame and for symmetry of appearance, the tail light 11 is centrally located and the signal 8 is larger than the signals 9 and 10 and arranged between the same. The several signal lights 8, 9 and 10 and the tail light 11 are substantially of similar formation and may form a part of the frame or be attached thereto as preferred and found most advantageous in the manufacture of the device. Each of the signals comprises a cylindrical casing closed at the front by a glass plate held in place by a confining ring and containing an electric bulb which is included in an independent circuit controllable in any preferred way, either by means of a pushbutton or a metal operated switch. The glass front of the signal 8 and tail light 11 are red and the glass front of the signals 9 and 10 are preferably of amber color and are provided with arrows, the one pointing to the right and the other to the left. A hollow connection 11′ unites the signal 8 with the frame and its opposite side walls flare downwardly. The hollow connection 11′ opens into the frame 1 and contains electric bulbs 12 which are concealed but which are so arranged as to illuminate the interior of the frame and make it possible to read the matter on the license plate 4 at the required distance from the vehicle. The electric bulb 12 and the bulb of the tail light 11 are included in the same circuit, whereas the electric bulbs of the directional signals 8, 9 and 10 are included in independent circuits, each containing a pushbutton which is conveniently disposed for operation by the driver of the vehicle. The signals 9 and 10 designate the intention of the driver to turn either to the left or to the right and the signal 8 designates the intention of the driver when about to stop or materially reduce speed so as to prevent a rear end collision. The circuit closing means may be of any nature and preferred arrangement common in the art. It is to be understood that the device will be provided with suitable means whereby it may be attached to a rear fender, or to the tire holder, or to any other preferred or convenient part of the vehicle.

What is claimed is:

A device of the character specified having a signal box, a signal casing made separately from said box and off-set therefrom, said casing having side walls provided with portions integral therewith in diverging relation, said portions being secured to the box, illuminating means intermediate said portions, said illuminating means being outwardly of the interior space of the box, means carrying said illuminating means closing the bottom of the casing and overlapping and supported at its opposite ends on the side walls of the casing, said box having an opening opposite said illuminating means, the inner surfaces of said portions constituting reflectors to assist in illuminating the box, and means supported from the casing carrying said illuminating means.

In testimony whereof I affix my signature in presence of two witnesses.

EMANUEL M. BARROS.

Witnesses:
 L. A. GOVERN,
 HERRICK McCLENTHEN.